US012229165B2

(12) United States Patent
Frank et al.

(10) Patent No.: US 12,229,165 B2
(45) Date of Patent: Feb. 18, 2025

(54) LIFE CYCLE MANAGEMENT (71) Applicant: Telefonaktiebolaget LM Ericsson (publ), Stockholm (SE)

(72) Inventors: Philipp Frank, Madrid (ES); Chin Lam Eng, Tokyo (JP); Raul Martin Cuerdo, Madrid (ES); Mitchell Ho, Sydney (AU); Chee Wai Ng, Sydney (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/624,095

(22) PCT Filed: Jul. 12, 2019

(86) PCT No.: PCT/SE2019/050689
§ 371 (c)(1),
(2) Date: Dec. 30, 2021

(87) PCT Pub. No.: WO2021/010871
PCT Pub. Date: Jan. 21, 2021

(65) Prior Publication Data
US 2022/0358149 A1 Nov. 10, 2022

(51) Int. Cl.
*G06F 16/00* (2019.01)
*G06F 16/28* (2019.01)
(Continued)

(52) U.S. Cl.
CPC ........... *G06F 16/285* (2019.01); *G06N 5/022* (2013.01); *H04L 41/16* (2013.01)

(58) Field of Classification Search
CPC .................................................. G06F 16/285
(Continued)

(56) References Cited

U.S. PATENT DOCUMENTS 6,601,192 B1 7/2003 Bowman-Amuah
9,900,790 B1 2/2018 Sheen et al.
(Continued)

FOREIGN PATENT DOCUMENTS

WO 2007052285 A2 5/2007
WO 2016004062 A1 1/2016
(Continued)

OTHER PUBLICATIONS

International Search Report and Written Opinion of the International Searching Authority for PCT International Application No. PCT/SE2019/050689 dated Apr. 21, 2020.
(Continued)

*Primary Examiner* — Alexandria Y Bromell
(74) *Attorney, Agent, or Firm* — Sage Patent Group (57) ABSTRACT

A method is provided for identifying operating conditions of a system. Input data relating to operation of the system is applied to a multi-class model for classification, where the multi-class model is configured for classifying the data into one of a plurality of predefined classes, and each class corresponds to a respective operating condition of the system. A confidence level of the classification by the multi-class model is determined. If the confidence level is below a threshold confidence level, the input data is applied to a plurality of binary models, where each binary model is configured for determining whether the data is or is not in a respective one of the predefined classes. If the plurality of binary models determine that the data is not in any of the respective predefined classes, the data can be taken into consideration when updating the multi-class model.

21 Claims, 8 Drawing Sheets

(51) Int. Cl.
  *G06N 5/022* (2023.01)
  *H04L 41/16* (2022.01)

(58) Field of Classification Search
  USPC .......................................................... 707/740
  See application file for complete search history.

(56) References Cited

U.S. PATENT DOCUMENTS

| | | | |
|---|---|---|---|
| 11,574,453 B2* | 2/2023 | Bleiweiss | G06T 3/60 |
| | | | 707/707 |
| 2008/0195577 A1 | 8/2008 | Fan et al. | |
| 2013/0304363 A1* | 11/2013 | Dai | H04M 15/58 |
| | | | 701/117 |
| 2015/0254555 A1 | 9/2015 | Williams, Jr. et al. | |
| 2015/0379423 A1 | 12/2015 | Dirac et al. | |
| 2018/0150713 A1* | 5/2018 | Farooqi | G06N 20/00 |
| | | | 707/707 |
| 2019/0068453 A1 | 2/2019 | Papaloukopoulos et al. | |
| 2019/0102701 A1 | 4/2019 | Singaraju et al. | |
| 2019/0149425 A1 | 5/2019 | Larish et al. | |

FOREIGN PATENT DOCUMENTS

| | | |
|---|---|---|
| WO | 2019233635 A1 | 12/2019 |
| WO | 2020164739 A1 | 8/2020 |

OTHER PUBLICATIONS

Garcia et al., "Context: The Missing Piece in the Machine Learning Lifecycle," Common Model Infrastructure (CMI '18) Aug. 20, 2018, London, UK, 4 pages.

Extended European Search Report for EP Patent Application No. 19937720.1, mailed Jun. 21, 2022, 12 pages.

Yaxing, et al. "Mobility Pattern Prediction based on Machine Learning, status May 22, 2018, Incorporates changes proposed in ML5G-1-050 and discussion on conference call May 16, 2018," International Telecommunication Union, Telecommunication Standardization Sector, Santa Jose, USA, Aug. 8-10, 2018, 12 pages.

* cited by examiner

LIFE CYCLE MANAGEMENT

TECHNICAL FIELD

This disclosure relates to a method for identifying operating conditions of a system, for example in order to manage the life cycle of the system.

BACKGROUND

Consistent service for end-users of a wireless network, such as a Long Term Evolution (LTE) or $5^{th}$ Generation (5G) network, depends on assuring consistent high performance of the network. It is therefore desirable to resolve any unexpected issue which may occur within the network as quickly as possible, so ensuring compliance with end-user Service Level Agreements.

It is known to use machine learning (ML) techniques to automate the processes of detection and classification of issues that arise in systems such as telecommunications networks, and to recommend network parameters to mitigate or overcome any network issue that is encountered.

Life-cycle management is a part of the process for successfully deploying the above ML solutions because it reduces the risk of critical prediction failures, leading to business impacts, and increases the development and deployment speed, hence improving the time-to-market. Life-cycle management may include processes such as model deployment, management, monitoring, and re-training.

SUMMARY

According to a first aspect, there is provided a method for identifying operating conditions of a system, the method comprising:
applying input data to a multi-class model for classification, wherein the input data relate to operation of the system, and wherein the multi-class model is configured for classifying the data into one of a plurality of predefined classes, each class corresponding to a respective operating condition of the system;
determining a confidence level of the classification by the multi-class model;
if the confidence level is below a threshold confidence level, applying the input data to a plurality of binary models, each binary model being configured for determining whether the data is or is not in a respective one of the predefined classes; and
if the plurality of binary models determine that the data is not in any of said respective predefined classes, taking said data into consideration when updating the multi-class model.

The system may comprise at least a part of a telecommunications network.

The operating conditions may comprise issues in the operation of the system.

The step of taking said data into consideration when updating the multi-class model may comprise:
performing a clustering operation on a plurality of input data that have been determined by the plurality of binary models not to be in any of said respective predefined classes; and
if a cluster is found, adding an additional predefined class into the multi-class model; and
generating a new binary model configured for determining whether the data is or is not in the additional predefined class.

The step of applying the input data to a plurality of binary models may comprise applying the input data to a respective binary model corresponding to each of said plurality of predefined classes.

The method may further comprise:
receiving input data from one example of the system, and updating the multi-class model and the binary models used in connection with said one example of the system, or
receiving input data from a plurality of examples of the system, and updating the multi-class model and the binary models that are used in connection with said plurality of examples of the system.

The method may comprise:
determining a measure of a proportion of the input data that is determined not to be in any of said respective predefined classes; and
if said measure is below a classification threshold, retraining the multi-class model and the binary models.

The method may comprise:
performing further training of the multi-class model and the binary models, using data for which said confidence level is above the threshold confidence level.

The method may comprise:
receiving raw data; and
normalising the raw data to form said input data.

The method may comprise:
if the plurality of binary models determine that the data is in a plurality of said respective predefined classes, determining that a corresponding plurality of said respective operating condition of the system have arisen.

According to another aspect, there is provided a computer program comprising instructions which, when executed on at least one processor, cause the at least one processor to carry out a method according to the first aspect.

A carrier may contain a computer program according to the other aspect, and the carrier may comprise one of an electronic signal, optical signal, radio signal or computer readable storage medium.

According to a further aspect, there is provided a computer program product comprising non transitory computer readable media having stored thereon a computer program according to the other aspect.

According to a still further aspect, there is provided apparatus for identifying operating conditions of a system, the apparatus comprising a processor and a memory, the memory containing instructions executable by the processor such that the apparatus is operable to carry out a method according to the first aspect.

This has the advantage that the model used for classification of the input data can be updated, by recognising data that do not relate to any of the existing classes, and by creating additional classes where necessary.

The method has the advantage that the binary classification is used efficiently because it is applied only to samples that have low confidence. Similarly, in certain embodiments, the selection of samples for re-training is based on the confidence of the prediction. This means that only a very limited number of normalized input data samples are required for re-training. In addition, in certain embodiments, where normalization of the input data is applied, data privacy may be promoted, because the original feature dataset cannot be reconstructed.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Aspects of the present disclosure provide a method for identifying operating conditions of a system, based on input data relating to operation of the system, using a model for classification, i.e. for classifying the data into one of a plurality of predefined classes, where each class corresponds to a respective operating condition of the system. For example, for any technical system, the system may be operating normally, or any one or more of a number of fault conditions may arise, and the normal operation and the fault conditions may be regarded as the operating conditions of the system. Input data relating to the operation of the system may then be used to determine which of the operating conditions applies at any given time.

By way of example, the following description relates to a system in the form of a radio access network in a cellular telecommunications network.

Figure 1:
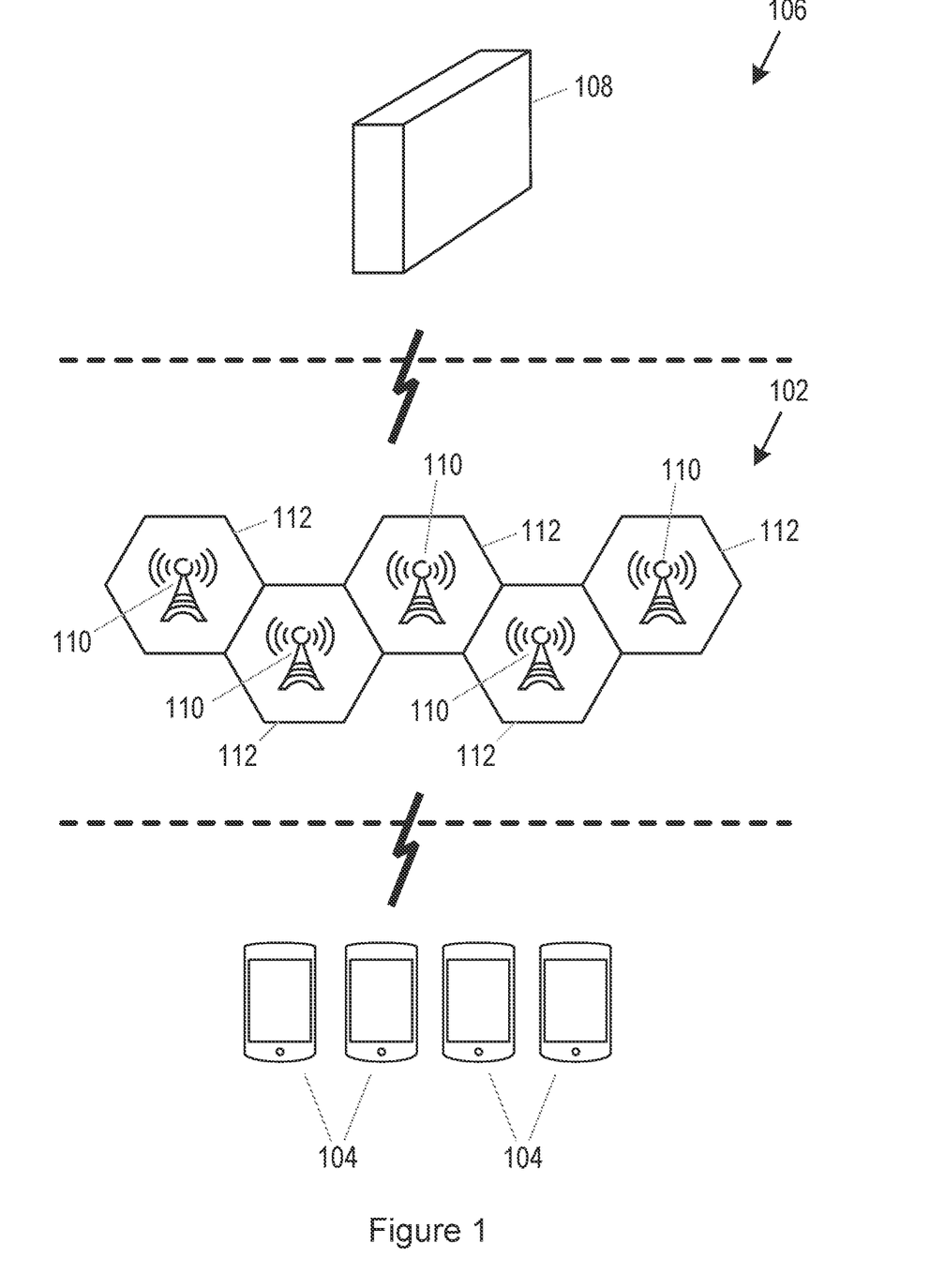
FIG. 1 shows a wireless communication system according to examples of the present disclosure.

FIG. 1 shows a cellular telecommunications network according to examples of the present disclosure. In the illustrated example, the system comprises a radio access network 102, terminal devices such as wireless terminals or User Equipments (UEs) 104, and a core network 106. The core network 106 may comprise a plurality of core network servers 108, and/or may be in communication with one or more servers 108.

The radio access network 102 is a wireless cellular network comprising a plurality of radio access network nodes 110, each serving one or more cells 112. In the illustrated example, each radio access network node 110 serves a single cell 112; however, it will be appreciated that in different examples, a radio access network node 110 may be configured to serve more than one cell, and/or a single cell may be served by more than one radio access node. Such an arrangement may be found in a heterogeneous network deployment, comprising one or more macro nodes supported by one or more micro, femto or pico nodes.

As used herein, a radio access network node corresponds to any type of network node which communicates with a terminal device. Examples of radio access network nodes include NodeB, eNodeB, Master eNodeB, Secondary eNodeB, a network node belonging to a Master Cell Group (MCG) or Secondary Cell Group (SCG), base station (BS), Multi-Standard Radio (MSR) radio node such as MSR BS, eNodeB, gNodeB, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS), etc. Where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The core network 106 comprises or is coupled to a server 108, which is therefore communicatively coupled to the radio access network 102. According to examples of the disclosure, the server 108 is configured to receive data from the radio access network 102, and to perform one or more methods for detecting operating conditions, including interference conditions, at a plurality of cells 112 in the radio access network 102 and classifying the impact of detected operating conditions in each cell 112 on the performance of the radio access network 102.

Methods for generating and training a model to detect operating conditions at a plurality of cells 112 in a radio access network 102 and to classify the impact of the detected operating conditions in the cells 112 on performance of the radio access network 102 according to the present disclosure use one or more Machine Learning (ML) algorithm. ML techniques have been used with considerable success in the domains of computer vision, language processing and many other sub-field applications.

Figure 2:
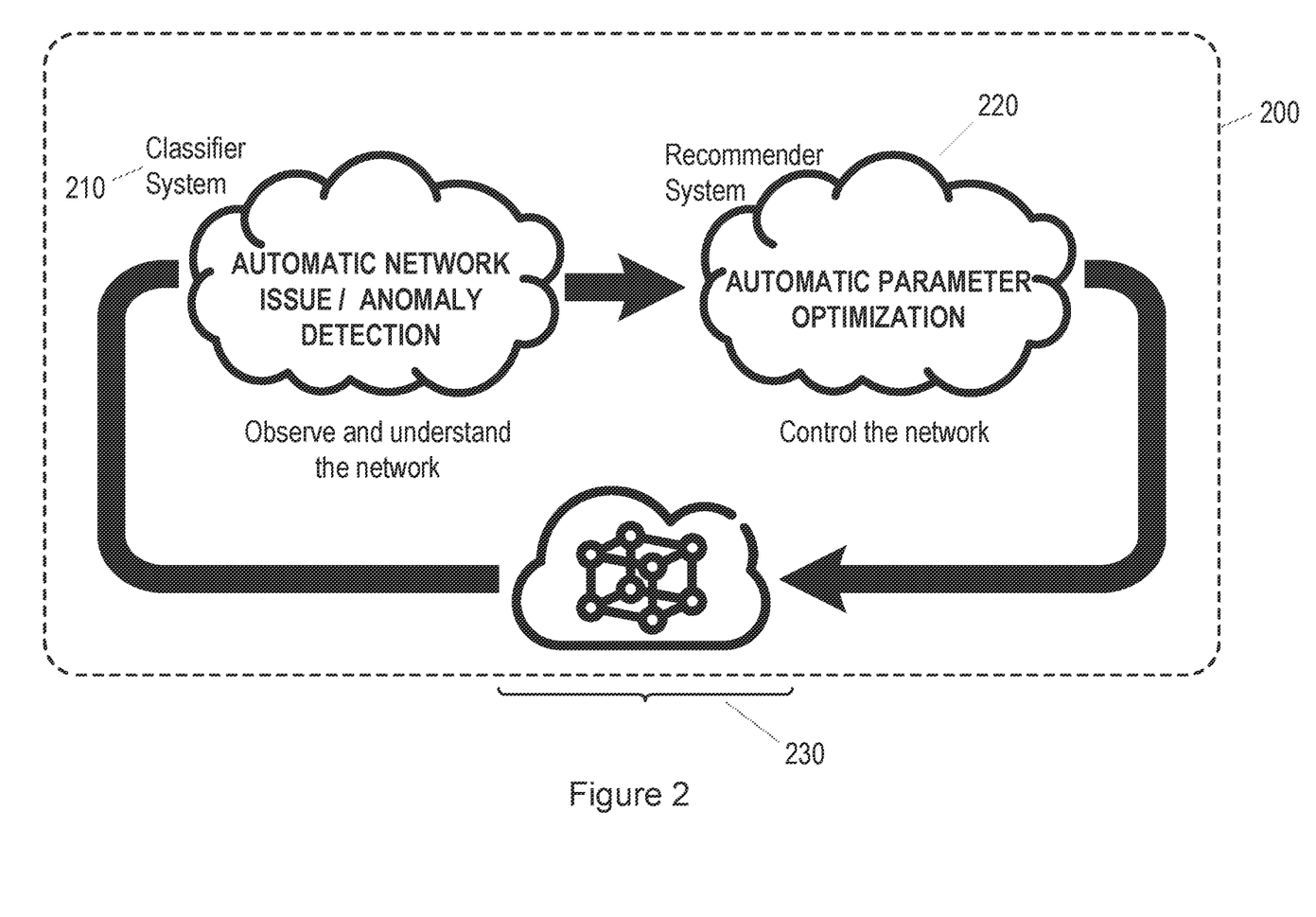
FIG. 2 illustrates an Artificial Intelligence (AI) system for network design and optimization (NDO)

FIG. 2 illustrates how the trained model for detecting operating conditions and classifying their impact may contribute to an Artificial Intelligence (AI) system for network design and optimisation (NDO), for example. Referring to FIG. 2, the AI NDO system comprises a classifier system 210, recommender system 220, and implementation engine/feedback loop 230. The classifier system 210 automatically detects and classifies different issues in the network, allowing for the recommender system 220 to provide detailed root-cause analysis and potential actions to be implemented in the network. These recommendations can be implemented in the network and the resulting performance can be analysed and fed back to the classifier system via the implementation engine/feedback loop 230. Methods according to the present disclosure may contribute to the realisation of the classifying system 210 and/or the recommender system 220, by training, using, and updating a model to achieve classification of operating conditions, and detecting when the data relate to operating conditions that are not part of the existing model. Solving this complex task of automatic detection and classification may provide significant advantages in terms of scalability, accuracy, and automation, as discussed in further detail below.

Figure 3:
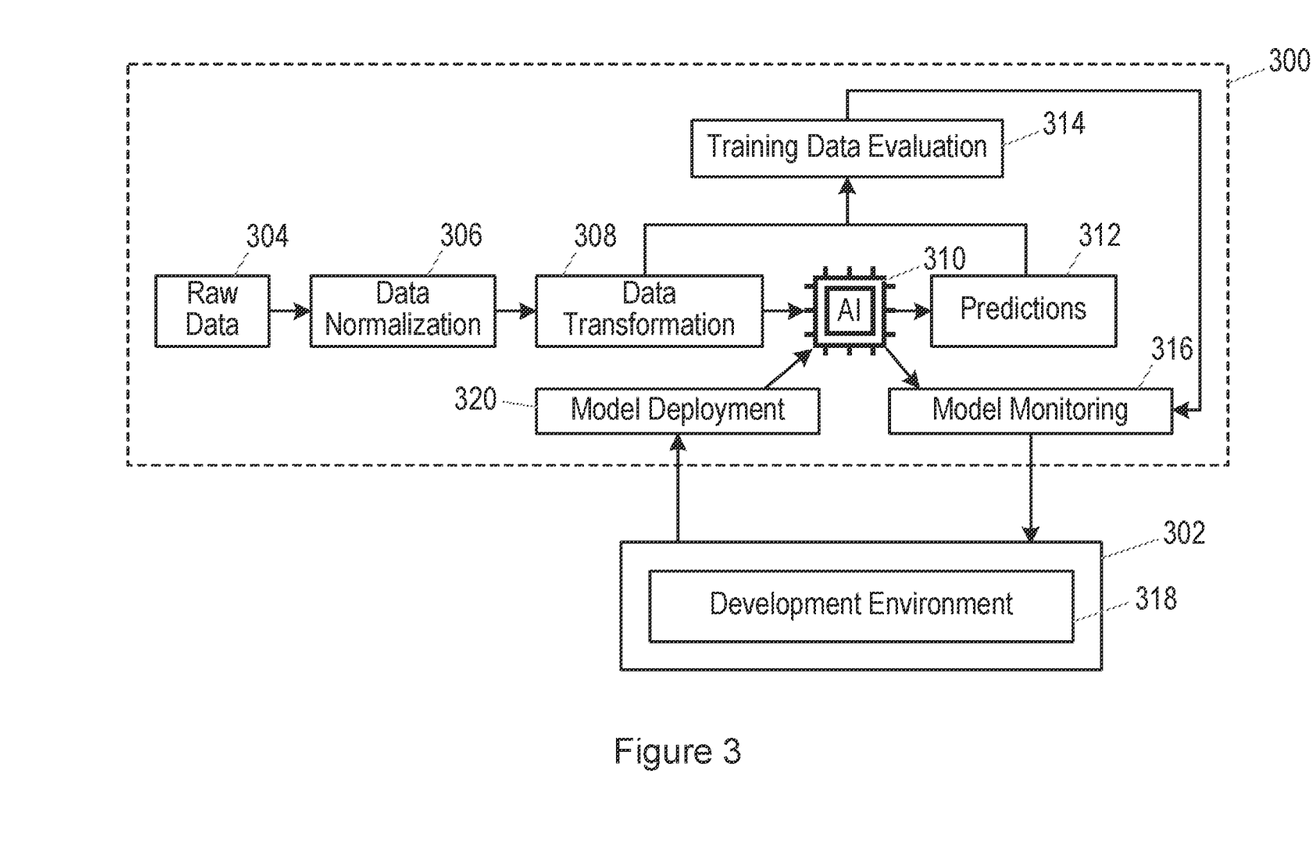
FIG. 3 is a block diagram illustrating an apparatus for performing a method according to an example of the present disclosure.

FIG. 3 illustrates the general form of an apparatus for identifying the operating conditions of a system.

In this illustrated example, the apparatus comprises a first part 300 that is mainly concerned with identifying the operating conditions of the system, and a second part 302 that is mainly concerned with controlling the deployment of the machine learning model used by the first part 300.

By way of example, in the case of a cellular telecommunications network as shown in FIG. 1, where the system is supplied by an equipment supplier to a network operator, the first part 300 of the apparatus may be deployed in the network, for example at a radio access network node 110, while the second part 302 of the apparatus may be deployed at a central site of the network, or may be deployed under the control of the equipment supplier.

In the apparatus of FIG. 3, raw data is generated by a block 304. In the illustrative example of identifying the operating conditions of a radio access network, the raw data comprises a time series of data, relating to certain performance metrics, typically at a plurality of cells and/or nodes in the radio access network. As one example, a performance metric may relate to the received signal power at one cell, and the raw data may be in the form of time series data representing the received signal power over a period of time. The received signal power may comprise interference signal per Physical Resource Block (PRB). The performance metrics monitored for each cell may relate to the load experienced by the cell, the radio conditions experienced by terminal devices served by the cell, etc. It will be appreciated that the proposed method is not limited to the relatively few well-known performance metrics that are frequently used in network management methods, but may include a relatively large number of performance metrics, including otherwise unconventional performance metrics. For example, the performance metrics may include one or more of:

- Active number of downlink and uplink users per Time Transmission Interval (TTI)
- Downlink and uplink scheduling entities per TTI
- Radio resource control (RRC) connection attempts
- Average and maximum number RRC connected users
- Downlink and uplink data volume for Data Radio Bearer (DRB) traffic
- Downlink and uplink data volume for Signaling Radio Bearer (SRB) traffic
- Downlink and uplink Physical Resource Block (PRB) utilization
- Physical Downlink Control Channel (PDCCH) Control Channel Element (CCE) load
- Average Channel Quality Indicator (CQI)
- Rate of CQI below a threshold (e.g. below 6)
- Downlink and Uplink user throughput
- Downlink and Uplink cell throughput
- Radio Access Channel (RACH) attempts
- Random access success ratio
- Downlink and uplink Hybrid ARQ (HARQ) discontinuous transmission ratio
- Average Physical Uplink Shared Channel (PUSCH) Signal-to-Noise-Ratio (SINR)
- Average Physical Uplink Control Channel (PUCCH) SINR
- PUSCH SINR below −2 dB rate
- PUCCH SINR below 0 dB rate
- PUSCH interference level
- PUCCH interference level
- Average pathloss
- Pathloss below 130 dB rate
- UE power limitation rate
- Average processor load
- 90th percentile of processor load The raw data is passed to a normalization block 306, which encodes the data to ensure that it is consistent. For example, in the case of a system including one or more radio access nodes, the process of normalization may ensure that the data is consistent between different cells, which may utilize different radio access technologies, different hardware, different measurement techniques, etc. During normalization, the data (i.e. performance metric) values are encoded to fall within a range defined by a universal minimum value and a universal maximum value, for example, in the range between 0 and 1. In this way, the performance metric values after this transformation correspond to intensities instead of absolute values.

In one embodiment, the normalization of the values comprises a determination of a maximum value for each performance metric. If the measured value for a performance metric at a particular time instance is equal to or greater than the maximum value for that performance metric, the measure value is encoded to be equal to 1. If the measured value for the performance metric is less than the maximum value, the measured value is encoded to a value between 0 and 1, reflecting the ratio of the measured value to the maximum value.

The normalized data may then form an array, with values for each performance metric at each of a plurality of times within the time window. In the illustrated embodiment, where the system comprises multiple cells of a telecommunications network, the normalized data may form a three-dimensional array, comprising values for each performance metric at each of a plurality of times within the time window, for each of a plurality of cells and/or time windows.

The normalized data is then passed to a data transformation block 308. The data is transformed into a form that is susceptible to classification using a machine learning approach. In this embodiment, the data is transformed into a 3D array representation, such that the classification of the data becomes an image pattern recognition problem, which can use a Convolutional Neural Network (CNN) to create a classifier model for detecting a large variety of operating conditions.

Thus, more specifically, in this embodiment, for each cell and each time window, an image dataset is formulated based on the raw data.

One example of suitable processes of data transformation and normalization are described in more detail in European patent application EP18382407.7 and in International patent application PCT/EP2019/053856.

Thus, as described above, the data is normalized in a way that means it can be released without danger of compromising anonymity. Because the data is normalized using different normalization thresholds for each performance metric, and these thresholds do not need to be shared, it will be not possible to reconstruct the original data from the normalized data. The actual input data to the model is a 3D array consisting of values between 0 and 1, with no reference to the original values or to other customer network data.

The transformed normalized data is passed to an Artificial Intelligence (AI) system 310, which is described in more detail below. This produces predictions 312, which relate to the operating conditions of the system, and in particular produces outputs that indicate how the input data has been classified. That is, the AI system classifies the input data into one of a plurality of predefined classes, with each class corresponding to a respective operating condition of the system.

The normalized input data from the block 308, and the predictions 312 (and the confidence levels of those predictions), can be fed to a training data evaluation block 314, which can select samples to be used in further training of the AI system, if required.

In addition, the outputs of the AI system 310, and of the training data evaluation block 314, are passed to a model monitoring block 316, which determines whether the model used by the AI system 310 is still suitable for use.

The output of the model monitoring block 316 is passed to the second part 302 of the apparatus, which comprises a development environment. As described in more detail below, this may be local or centralized. A local development environment is typically connected to only one AI system 310, for example associated with a single system being monitored, while a centralized development environment is typically connected to more than one AI system 310, for example associated with multiple systems being monitored.

The development environment 302 may for example perform the functions of model versioning control, model release, and model development and re-training.

A new or updated model generated by the development environment is passed to model deployment block 320 in the first part 300 of the system, for use by the AI system 310.

Figure 4:
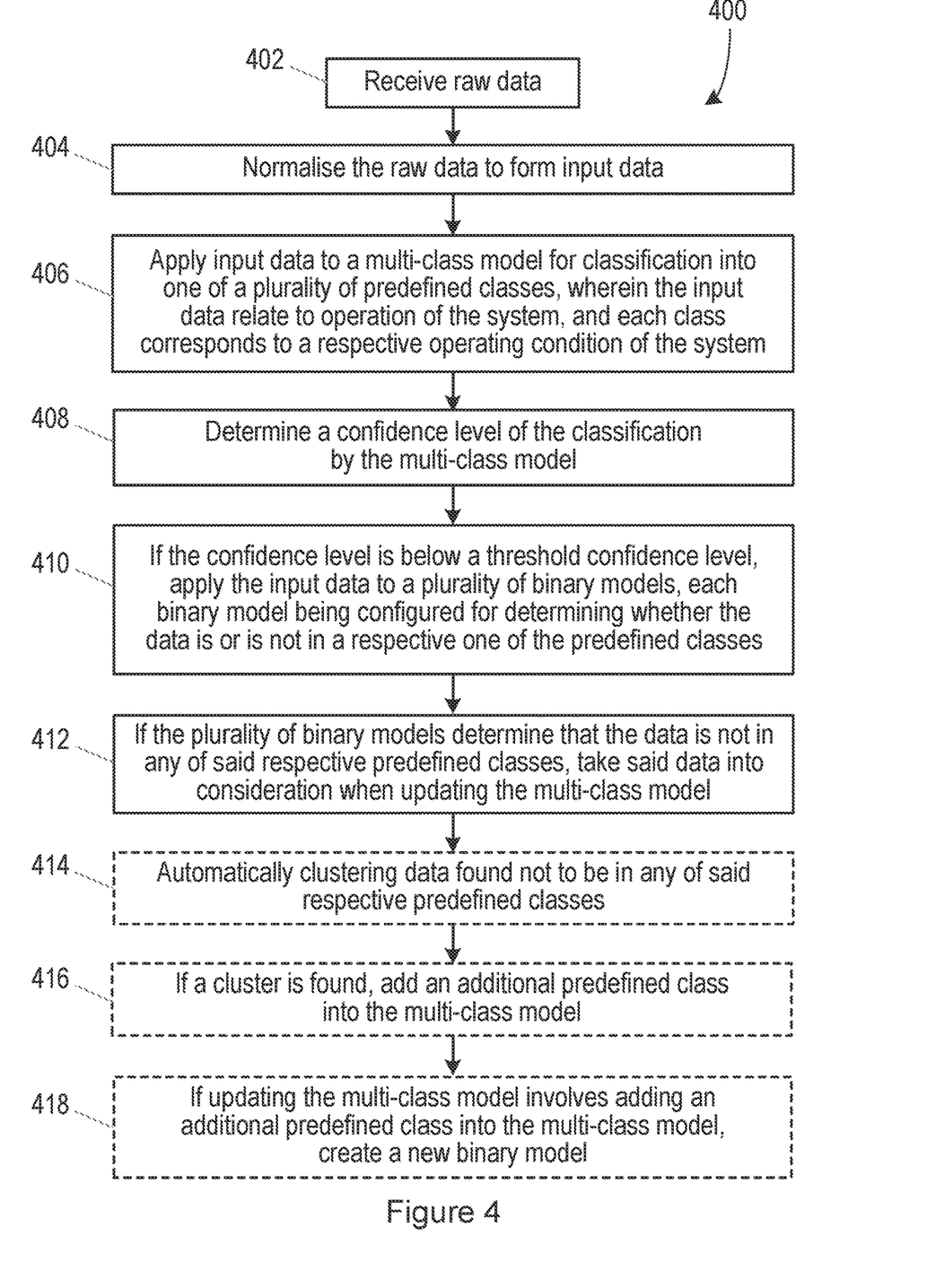
FIG. 4 is a flow chart illustrating process steps in a method according to an example of the present disclosure.

FIG. 4 is a flow chart illustrating process steps in a method 400 according to a first aspect of the present disclosure. The method 400 is for identifying operating conditions of a system, such as a cell in a wireless cellular network.

The method may in some examples be carried out in a server comprised within or connected to a core network that is in communication with a cellular radio access network, or in other examples may be carried out by a virtualised application or network function running in the cloud. In further examples, the method may be carried out within a radio access node or virtual function logically connected to the radio access node.

In step 402, the raw data, relating to operation of the system that is being monitored, is received from one or more sensor or meter provided on the system.

In step 404, the raw data is normalised and transformed as described above, to transform data in a form that can be inputted to the AI system.

Figure 5:
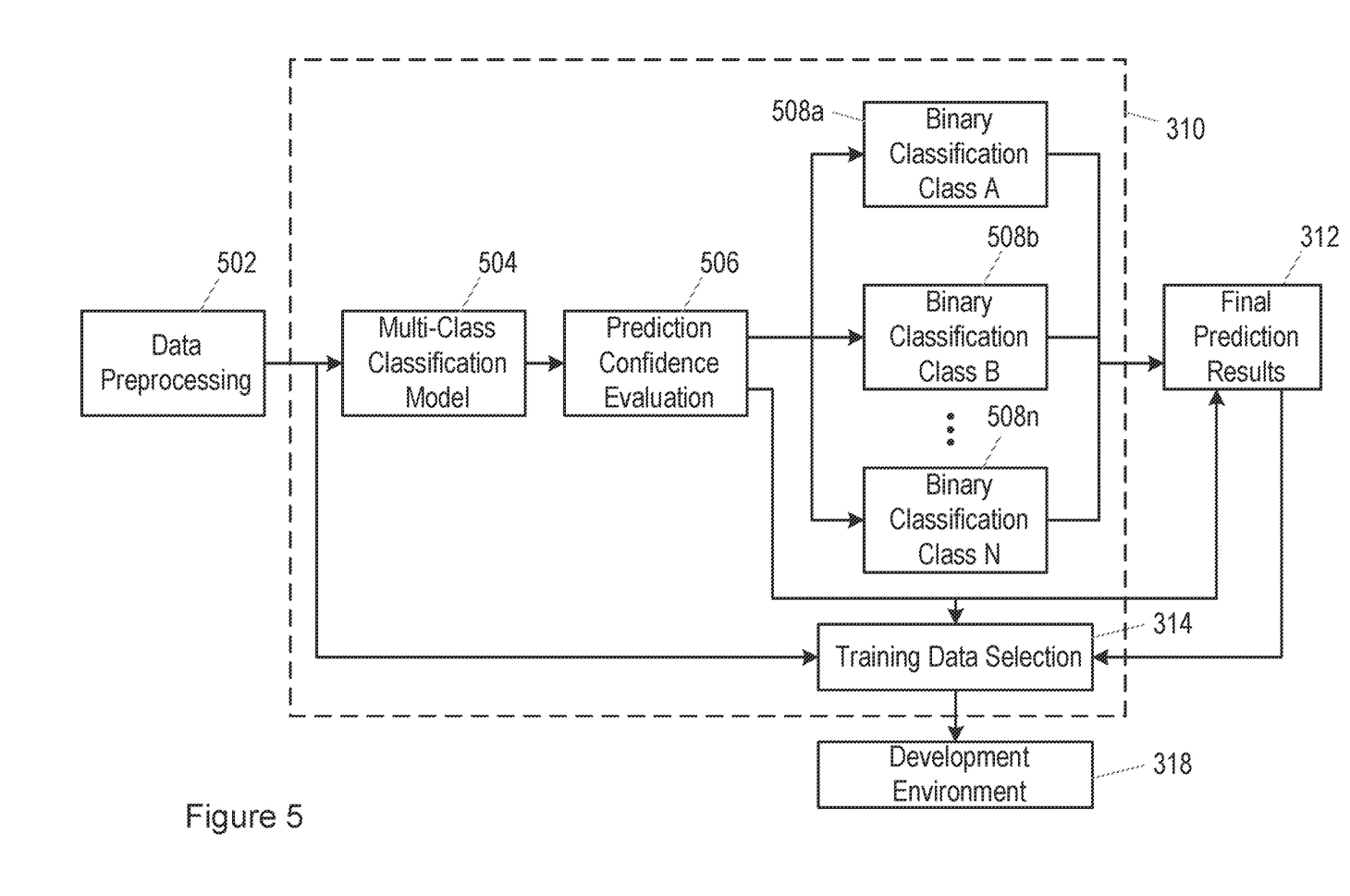
FIG. 5 is a more detailed block diagram illustrating the apparatus for performing a method according to an example of the present disclosure.

FIG. 5 is a block diagram illustrating in more detail the form of the AI system 310 in FIG. 3. Thus, FIG. 5 also shows a data preprocessing block 502 for performing steps such as the normalisation and transformation described above.

The input data is then applied to the AI system 310.

Specifically, in step 406, the input data is applied to a to a multi-class classification model 504 in the AI system 310. The multi-class classification model 504 has already been trained using a number of pieces of data that are each known to belong to a respective one of a plurality of predefined classes, such that it is able to classify the input data into one of the plurality of predefined classes. Each class corresponds to a respective operating condition of the system.

In the illustrated embodiment, where the system that is being monitored is a radio access network comprising multiple radio access nodes, the input data may relate to an operating parameter or condition of a particular radio access node, and the predefined classes may correspond to specific issues that arise in the operation of the radio access node. For example, the predefined classes may correspond to faulty or non-faulty cell conditions, and the faulty cell conditions may for example conditions which relate to a load experienced by the cell or conditions which relate to performance of the cell. Thus, specific examples of predefined cell conditions include: Cell Load; High Downlink Utilization; High Uplink Utilization; High Processor Load; Poor physical uplink control channel (PUCCH) Performance; Poor random access channel (RACH) Accessibility; and Signalling Load. For a well-configured network operating normally, it would be expected that at least 80% or 90% of cells would be operating without any faults, at any given time.

One example of a suitable multi-class classification model is described in more detail in European patent application EP18382407.7 and in International patent application PCT/EP2019/053856.

Thus, the multi-class classification model 504 classifies the input data into one of a plurality of predefined classes. The output of the multi-class classification model 504 is then passed in step 408 to a prediction confidence evaluation block 506, in order to determine a measure of the confidence in the classification by the multi-class model.

More specifically, the confidence level is compared with a threshold confidence level. For example, the threshold confidence level may be set to a confidence of 90%. If it is determined that there is a high degree of confidence (i.e. a confidence above the threshold confidence level) in the prediction generated by the multi-class classification model 504, the result is passed to the block 312, in which the final prediction results are determined.

Assuming that the operating conditions of the system are relatively stable, and the multi-class classification model has been trained with appropriate training data, most of the predictions will have a high confidence with a high probability.

However, there will be some input data samples for which the multi-class classification model produces a prediction with a lower prediction probability, i.e. a lower confidence, and specifically a confidence level that is below the threshold confidence level mentioned above. For example, this may occur because there are two or more issues arising at the same time. As another example, the multi-class classification model may produce a prediction with a lower prediction probability in a situation in which a previously unseen issue has arisen, giving rise to a new pattern in the input data, which will therefore not fit well into any of the predefined classes.

Therefore, if it is determined that there is a low degree of confidence in the prediction generated by the multi-class classification model 504, the process of FIG. 4 passes to step 410, and the input data is applied to a plurality of binary classification models 508a, 508b, ..., 508n. Each binary model 508a, 508b, ..., 508n corresponds to a respective one of the predefined classes that are used in forming the multi-class classification model 504. Each binary model 508a, 508b, ..., 508n has been trained using a number of pieces of data that are known to belong to the respective class, as well as a number of pieces of data that are known not to belong to the respective class, so that the binary model is configured for determining whether the data is or is not in the respective one of the predefined classes.

The results of the multiple binary classifications are passed to the block 312, in which the final prediction results are determined.

The application of the binary classifications to the input data samples for which the multi-class classification produces low confidence predictions can resolve the situation described above. Moreover, this results in efficient usage of the binary classification stage because only the data for which the multi-class classification produces low confidence predictions is applied to the binary classification stage.

If the multi-class classification model produces a prediction with lower confidence because there are two or more issues arising at the same time, then the two relevant binary classification models corresponding to those issues should each produce a positive result.

However, if the multi-class classification model produces a prediction with lower confidence because a previously unseen issue has arisen, giving rise to a new pattern in the input data, then all of the binary classification models corresponding to the known issues should produce a negative result.

An input data sample for which all of the binary classifications produce a negative result is labeled as "out-of-class", i.e. none of the predefined classes is predicted.

If all of the binary classification models 508a, 508b, . . . , 508n corresponding to the known issues produce a negative result, and the input data sample is labeled as "out-of-class", the process shown in FIG. 4 passes to step 412, and that data sample is taken into consideration when updating the multi-class model.

The number of "out-of-class" data samples is counted, and may be used to determine when the multi-class model should be updated. In one embodiment, the ratio of the number of "out-of-class" data samples to the total number of data samples is calculated. This ratio is a reliable indicator of the severity of the problem of new issues arising (referred to as "model drift") and therefore, when this ratio exceeds a threshold ratio (for example 20% or 30%), it can be determined that re-training and re-deployment of the ML models should be initiated.

These "out-of-class" samples can be automatically fed back to the training data evaluation block 314, and then to the development environment 318 where model releases are maintained.

In addition, some of the samples that were classified by the multi-class classification block 504 with high confidence are also passed to the training data evaluation block 314.

In step 414, if it is determined that the the multi-class model should be updated, a clustering operation is performed on the recently acquired "out-of-class" samples. This can identify which "out-of-class" samples are similar to each other, indicating that they are caused by a newly arising issue in the operation of the system, rather than randomly arising "out-of-class" samples, which may have no discernable cause.

If a cluster is found in step 414, it is determined that an additional predefined class should be added into the multi-class model used by the multi-class classification block 504, and the process passes to step 416. The automatic clustering can be combined with human intervention using domain knowledge to label any new class or classes efficiently. The samples that are identified as belonging to the newly identified class can be included into an updated training dataset to generate the updated model for use in detecting the new issues or recommendations. Thus, the problem of model drift, where a model that was trained using suitable training data needs to be regenerated because of new issues arising in the system, is automatically detected by identifying out-of-class data samples using the additional binary classification.

In addition, in step 418, a corresponding new binary classifier is generated, by training with a number of data samples that correspond to the newly identified class and a number of data samples that are known not to correspond to the newly identified class.

Thus, the model can be updated and extended to take account of newly arising issues, by using the out-of-class data samples to create an additional class.

In addition, the model can be maintained on a regular basis by automatically feeding back a representative number of model input samples for each class. For example, if predictions are made daily, a certain number of data samples may be fed back each day. Specifically, data samples that are identified by the prediction confidence evaluation block 506 as having a high prediction confidence are identified, and passed to the training data evaluation block 314. This ensures as far as possible that the labeling, i.e. the predicted class for those samples, is accurate, and therefore ensures the selection of optimal samples for use in re-training. A human expert can also inspect new data before it is added into the data used for training.

After a certain period of time, model re-training can be initiated, and this can be based on the original training data plus the newly collected data samples. This allows the future prediction accuracy to be improved.

Advantageously, the method may take account of data gathered from more than one system.

Figure 6:
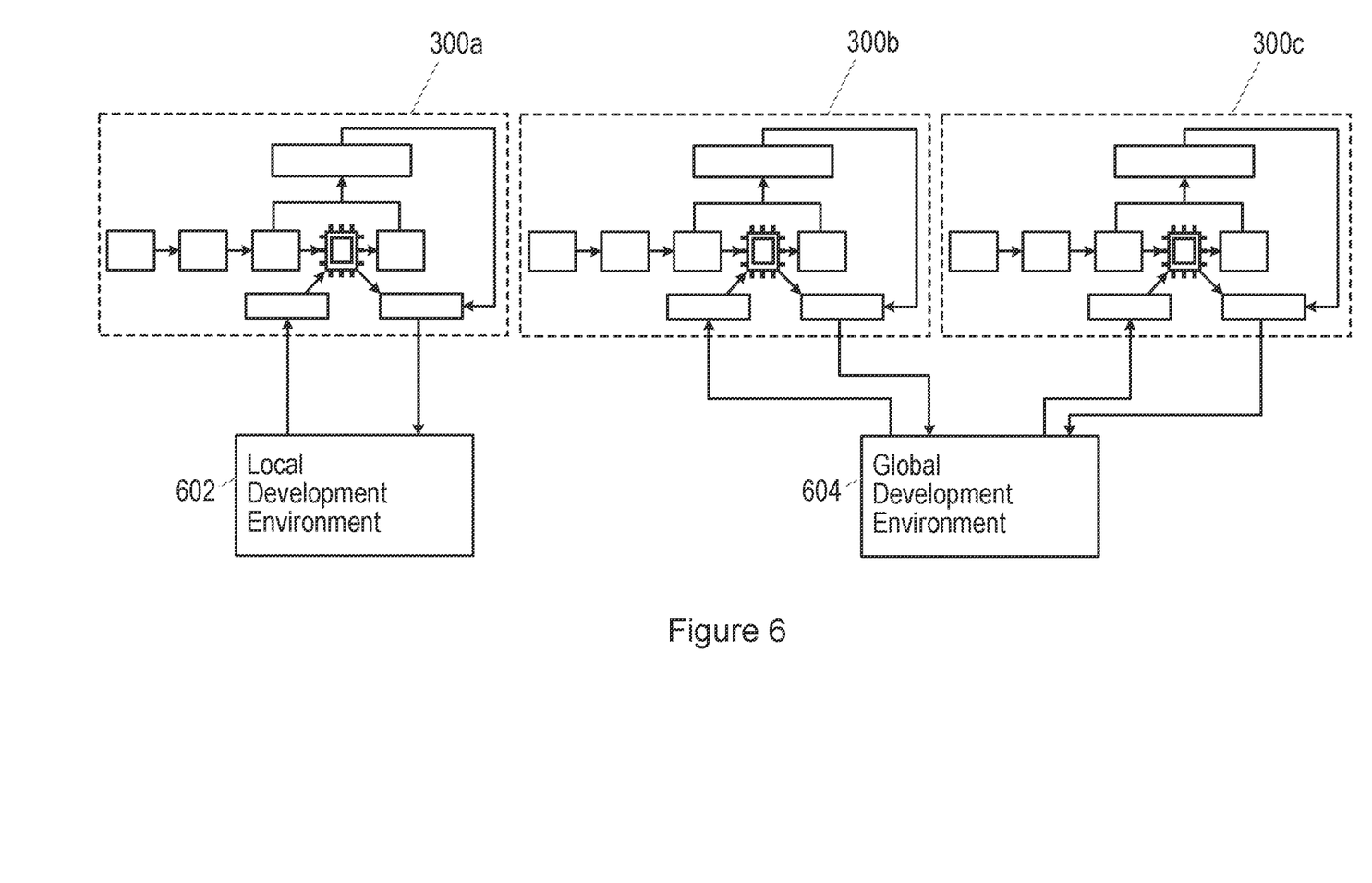
FIG. 6 is a block diagram illustrating a further apparatus for performing a method according to an example of the present disclosure.

FIG. 6 is a block diagram of apparatus for taking account of data gathered from more than one system.

Specifically, FIG. 6 shows an apparatus 300a which is the same as the apparatus 300 shown in FIG. 3, which receives input data from one system (i.e. one network), and the development environment 602 is a local development environment. That is, there is no agreement that data generated in that system can be shared, and so any learning, i.e. any updating of the models used by the apparatus 300a, must be based only on the data generated in that system.

In addition, FIG. 6 shows an apparatus 300b which is the same as the apparatus 300 shown in FIG. 3, which receives input data from a second system (i.e. a network), and an apparatus 300c which is again the same as the apparatus 300 shown in FIG. 3, which receives input data from a third system (i.e. another network). However, the apparatus 300b and the apparatus 300c are associated with the same development environment 604, which is therefore referred to as a global development environment.

In this case, there is an agreement for sharing the data generated in the second and third systems, for example on an anonymized and normalized basis. This prevents the re-construction of the actual dataset.

The learning, i.e. the updating of the models used by the apparatus 300b, 300c, can then be based on the data generated in both systems, allowing faster and more generalized learning to take place, and allowing more appropriate models to be deployed in both systems.

Whether the updating of the models receives input data from one system or from a plurality of systems, certain embodiments of the method involve collecting and incorporating input data samples that have been identified by the prediction confidence evaluation block 506 as having a high prediction confidence. Using even a relatively small number of these input data samples for each class in the training dataset for updating the models improves the prediction accuracy of the models. For example, an initial multi-class model may be trained using, say, 200 samples per class. Selecting a further 10 samples per class per day from a system would allow 70 new samples per class in only one week. If data can be obtained from multiple systems, for example 5 different systems, this would allow 350 new samples per class in one week. The amount of data required to be transferred for this training is small. For example, for a data set with 792 features, 10 samples per class is less than 5 kbytes.

Figure 7:
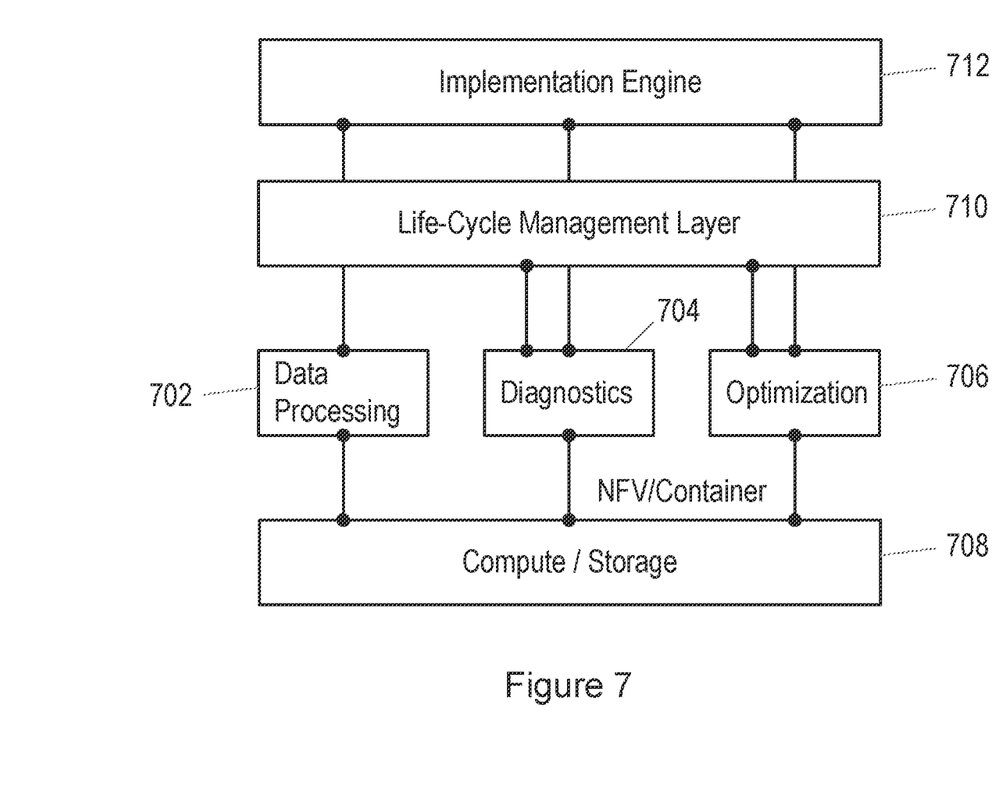
FIG. 7 illustrates an example implementation of aspects of the present disclosure.

FIG. 7 illustrates an example implementation of aspects of the present disclosure, in particular for use in an embodiment in which the method is applied to a cellular telecommunications network.

A data processing block 702 is provided for extracting and transforming data, such as configuration data, performance data and cell trace data. A diagnostics block 704 is provided for identifying and classifying accessibility and load issues, mobility issues, coverage issues and interference issues, and for performing root-cause analytics to obtain insights relating to the accessibility and load, mobility, coverage, and interference. An optimization block 706 is provided for generating recommendations and actions relating to the accessibility and load, mobility, coverage, and interference.

The data processing block 702, diagnostics block 704, and optimization block 706 are connected to a compute/storage bock 708, a life-cycle management layer 710, and an implementation engine 712.

The diagnostics block 704 identifies and classifies various issues, using different models, and the life-cycle management layer 710 receives newly generated data samples and controls updating and re-training the models, as described above. The implementation engine 712 implements changes in the network, in response to the diagnostics and the recommendation analysis.

All of the different network optimization modules shown in FIG. 7, including the life-cycle management block 710, are containerized and deployed in the cloud or on a suitable platform, in order to meet the customer deployment requirements.

Figure 8:
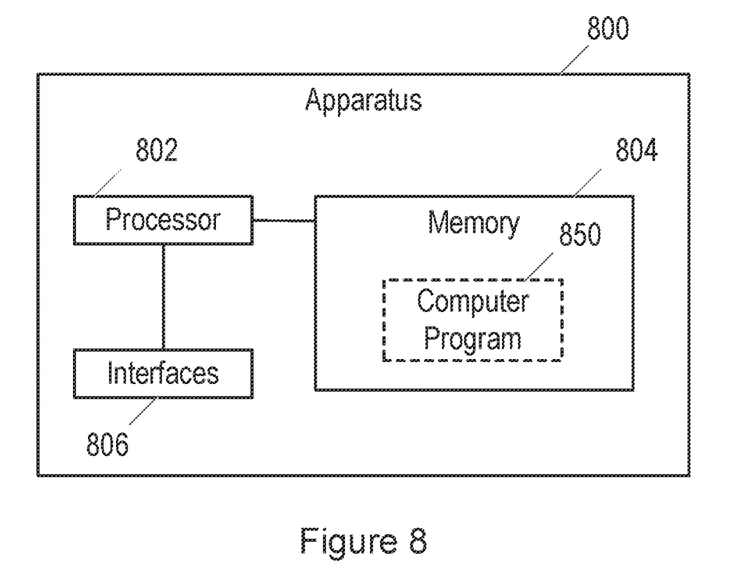
FIGS. 8 and 9 are block diagrams illustrating apparatus according to examples of the present disclosure.
Figure 9:
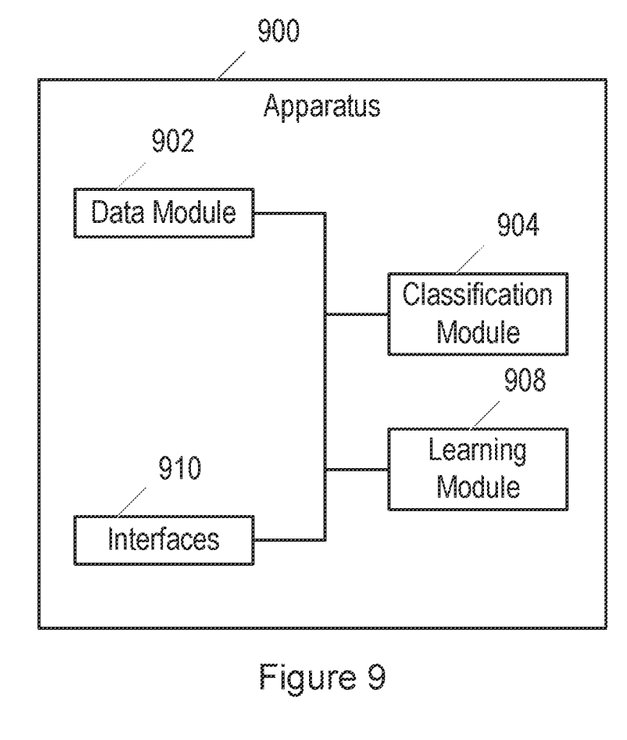

FIGS. 8 and 9 are block diagrams illustrating examples of apparatus 800, 900 which may carry out examples of the method 400 as discussed above.

FIG. 8 illustrates a first example of apparatus 800, which may implement some or all of the steps of method 400, for example on receipt of suitable instructions from a computer program 850. Where the method is used in connection with a system that comprises a part of a telecommunications network, the apparatus may for example be located in a server of or connected to a core network, a base station or other radio access node, or a server in a data center running one or more virtual machines executing the steps of the method 400. Referring to FIG. 8, the apparatus 800 comprises a processor or processing circuitry 802, a memory 804 and interfaces 806. The memory 804 contains instructions executable by the processor 802 such that the apparatus 800 is operative to conduct some or all of the steps of the method 400. The instructions may also include instructions for executing one or more telecommunications and/or data communications protocols. The instructions may be stored in the form of the computer program 850. In some examples, the processor or processing circuitry 802 may include one or more microprocessors or microcontrollers, as well as other digital hardware, which may include digital signal processors (DSPs), special-purpose digital logic, etc. The processor or processing circuitry 802 may be implemented by any type of integrated circuit, such as an Application Specific Integrated Circuit (ASIC), Field Programmable Gate Array (FPGA) etc. The memory 804 may include one or several types of memory suitable for the processor, such as read-only memory (ROM), random-access memory, cache memory, flash memory devices, optical storage devices, solid state disk, hard disk drive etc.

FIG. 9 illustrates another example of apparatus 900, which may also be located in a server of or connected to a core network, a base station or other radio access node, or a server in a data center running one or more virtual machines executing the steps of the method 400. Referring to FIG. 9, the apparatus 900 comprises a plurality of functional modules, which may execute the steps of method 400 on receipt of suitable instructions for example from a computer program. The functional modules of the apparatus 900 may be realised in any appropriate combination of hardware and/or software. The modules may comprise one or more processors and may be integrated to any degree. The apparatus 900 is for identifying operation conditions of a system, for example one or more cell in a wireless cellular network. Referring to FIG. 9, the apparatus 900 comprises a data module 902 for obtaining input data relating to operation of the system. The apparatus also comprises a classification module 904 for performing a classification on the input data received from one or more data module 902. The classification module 904 may comprise a multi-class classifier using a multi-class model and a binary classifier using a plurality of binary models.

The apparatus 900 further comprises a learning module 908 for updating the multi-class model and the plurality of binary models used by the classification module 904, based on selected input data. The apparatus 900 also comprises interfaces 910.

Thus, there are described a method and apparatus for performing life-cycle-management of the various models that are used for issue detection, classification and automatic recommendation. The described approach provides benefits in terms of scalability and automation for supervised learning models.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method for identifying operating conditions of a system comprising a telecommunications system, the method comprising:
 applying input data, relating to operation of the telecommunications system, to a multi-class model to classify the input data into one of a plurality of predefined classes each corresponding to a faulty or non-faulty operating condition of the telecommunications system;
 determining a confidence level of the classification by the multi-class model;
 if the confidence level is below a threshold confidence level, applying the input data to a plurality of binary models, each binary model being configured for determining whether the input data is or is not in a respective one of the predefined classes; and
 if the plurality of binary models determine that the input data is not in any of said respective predefined classes, taking said input data into consideration when updating the multi-class model.

2. The method according to claim 1, wherein the telecommunications system comprises at least a part of a telecommunications network.

3. The method according to claim 1, wherein taking said data into consideration when updating the multi-class model comprises:
 performing a clustering operation on a plurality of input data that have been determined by the plurality of binary models not to be in any of said respective predefined classes; and
 if a cluster is found, adding an additional predefined class into the multi-class model; and
 generating a new binary model configured for determining whether the data is or is not in the additional predefined class.

4. The method according to claim 1, wherein applying the input data to a plurality of binary models comprises applying the input data to a respective binary model corresponding to each of said plurality of predefined classes.

5. The method according to claim 1, comprising:
receiving input data from one example of the telecommunications system, and updating the multi-class model and the binary models used in connection with said one example of the telecommunications system, or
receiving input data from a plurality of examples of the telecommunications system, and updating the multi-class model and the binary models that are used in connection with said plurality of examples of the telecommunications system.

6. The method according to claim 1, comprising:
determining a measure of a proportion of the input data that is determined not to be in any of said respective predefined classes; and
if said measure is below a classification threshold, retraining the multi-class model and the binary models.

7. The method according to claim 1, comprising:
performing further training of the multi-class model and the binary models, using data for which said confidence level is above the threshold confidence level.

8. The method according to claim 1, comprising:
receiving raw data; and
normalising the raw data to form said input data.

9. The method according to claim 1, comprising:
if the plurality of binary models determine that the data is in a plurality of said respective predefined classes, determining that a corresponding plurality of said respective operating condition of the telecommunications system have arisen.

10. A computer program comprising instructions which, when executed on at least one processor, cause the at least one processor to carry out a method according to claim 1.

11. A computer program product comprising non transitory computer readable media having stored thereon a computer program as claimed in claim 10.

12. Apparatus for identifying operating conditions of a system comprising a telecommunications system, the apparatus comprising a processor and a memory, the memory containing instructions executable by the processor such that the apparatus is operable to:
apply input data, relating to operation of the telecommunications system, to a multi-class model to classify the input data into one of a plurality of predefined classes each corresponding to a faulty or non-faulty operating condition of the telecommunications system;
determine a confidence level of the classification by the multi-class model;
if the confidence level is below a threshold confidence level, apply the input data to a plurality of binary models, each binary model being configured for determining whether the input data is or is not in a respective one of the predefined classes; and
if the plurality of binary models determine that the input data is not in any of said respective predefined classes, take said input data into consideration when updating the multi-class model.

13. Apparatus as claimed in claim 12, wherein the operation to take said data into consideration when updating the multi-class model comprises:
performing a clustering operation on a plurality of input data that have been determined by the plurality of binary models not to be in any of said respective predefined classes; and
if a cluster is found, adding an additional predefined class into the multi-class model; and
generating a new binary model configured for determining whether the data is or is not in the additional predefined class.

14. Apparatus as claimed in claim 12, wherein the telecommunications system comprises at least a part of a telecommunications network.

15. Apparatus as claimed in claim 12, wherein applying the input data to a plurality of binary models comprises applying the input data to a respective binary model corresponding to each of said plurality of predefined classes.

16. Apparatus as claimed in claim 12, further operable to:
receive input data from one example of the telecommunications system, and updating the multi-class model and the binary models used in connection with said one example of the telecommunications system, or
receive input data from a plurality of examples of the telecommunications system, and updating the multi-class model and the binary models that are used in connection with said plurality of examples of the telecommunications system.

17. Apparatus as claimed in claim 12, further operable to:
determine a measure of a proportion of the input data that is determined not to be in any of said respective predefined classes; and
if said measure is below a classification threshold, retrain the multi-class model and the binary models.

18. Apparatus as claimed in claim 12, further operable to:
perform further training of the multi-class model and the binary models, using data for which said confidence level is above the threshold confidence level.

19. Apparatus as claimed in claim 12, further operable to:
receive raw data; and
normalise the raw data to form said input data.

20. Apparatus as claimed in claim 12, further operable to:
if the plurality of binary models determine that the data is in a plurality of said respective predefined classes, determine that a corresponding plurality of said respective operating condition of the telecommunications system have arisen.

21. The method according to claim 1, wherein the faulty or non-faulty operating condition of the telecommunications system comprises at least one of cell load, downlink utilization, uplink utilization, processor load, physical uplink control channel performance, random access channel accessibility, signalling load, mobility, coverage, and interference.

* * * * *